United States Patent
Singh et al.

(10) Patent No.: US 7,925,539 B1
(45) Date of Patent: Apr. 12, 2011

(54) METHOD AND APPARATUS FOR SCREENING TRANSACTIONS ACROSS A GLOBAL COMPUTER NETWORK

(75) Inventors: Vikram Singh, Milwaukee, WI (US);
Lisa McClung, Chicago, IL (US);
Gilbert C. L. Leong, Singapore (SG);
Karl-Heinz Hetfleisch,
Johannisbrunnenstrabe (DE)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 09/468,403

(22) Filed: Dec. 20, 1999

Related U.S. Application Data (60) Provisional application No. 60/169,249, filed on Dec. 6, 1999.

(51) Int. Cl.
*G06Q 30/00* (2006.01)
*G06F 7/00* (2006.01)

(52) U.S. Cl. .......................... 705/26; 235/376; 235/382

(58) Field of Classification Search .................. 705/26, 705/38, 51, 18, 22, 27, 28; 235/376, 380, 235/382, 382.5, 383, 385
See application file for complete search history.

(56) References Cited

U.S. PATENT DOCUMENTS

| | | | | |
|---|---|---|---|---|
| 5,347,632 A * | 9/1994 | Filepp et al. | ................... | 709/202 |
| 5,592,375 A * | 1/1997 | Salmon et al. | .................... | 705/7 |
| 5,722,526 A * | 3/1998 | Sharrard | ........................ | 194/346 |
| 5,732,400 A * | 3/1998 | Mandler et al. | ................. | 705/26 |
| 5,758,072 A * | 5/1998 | Filepp et al. | ................... | 709/220 |
| 5,758,095 A * | 5/1998 | Albaum et al. | .................... | 705/2 |
| 5,774,870 A * | 6/1998 | Storey | ............................. | 705/14 |
| 5,845,255 A * | 12/1998 | Mayaud | ............................ | 705/3 |
| 5,912,818 A * | 6/1999 | McGrady et al. | ............. | 700/232 |
| 5,978,476 A * | 11/1999 | Redman et al. | .................. | 705/51 |
| 5,999,908 A * | 12/1999 | Abelow | ............................ | 705/1 |
| 6,016,504 A * | 1/2000 | Arnold et al. | ................... | 709/200 |
| 6,021,392 A * | 2/2000 | Lester et al. | ....................... | 705/2 |
| 6,055,519 A * | 4/2000 | Kennedy et al. | ................ | 705/80 |
| 6,067,524 A * | 5/2000 | Byerly et al. | ..................... | 705/3 |
| 6,088,686 A * | 7/2000 | Walker et al. | .................... | 705/38 |
| 6,112,182 A * | 8/2000 | Akers et al. | ....................... | 705/2 |
| 6,163,732 A * | 12/2000 | Petke et al. | ................... | 700/106 |
| 6,202,060 B1 * | 3/2001 | Tran | ................................. | 707/3 |
| 6,212,634 B1 * | 4/2001 | Geer, Jr. et al. | ............... | 713/156 |

(Continued)

*Primary Examiner* — Andrew Joseph Rudy
(74) *Attorney, Agent, or Firm* — Ziolkowski Patent Solutions Group, SC

(57) ABSTRACT

A system and method for screening purchases and sorting the types of products sought to be purchased over a computer network, such as the Internet, is disclosed. The invention includes providing a user interface for a customer to access an automated seller facility, the facility having two types of product categories, unrestricted and restricted. Access to the facility takes place over a global computer network, with the user interface configured to allow the customer to enter customer data for the purpose of purchasing products from the automated seller facility. The invention next includes receiving the customer data, comprising an account number and a product order from the customer, and specifying a desired product to be purchased over the computer network. The invention further includes determining whether the product desired by the customer falls within the restricted product category, and if it does, the system provides for checking whether the customer is in fact an authorized buyer of such a restricted product. A customer authorization code is only issued if the customer is an authorized buyer of restricted products or if the desired product falls within the unrestricted product category. The authorization code therefore indicates that both the customer and the product order have been accepted to purchase the desired product. Conversely, if the customer and product order have not been accepted, the product order is rejected.

47 Claims, 4 Drawing Sheets

U.S. PATENT DOCUMENTS

| | | | | |
|---|---|---|---|---|
| 6,226,623 B1 * | 5/2001 | Schein et al. | | 705/35 |
| 6,249,773 B1 * | 6/2001 | Allard et al. | | 705/26 |
| 6,263,447 B1 * | 7/2001 | French et al. | | 713/201 |
| 6,311,169 B2 * | 10/2001 | Dubon | | 705/38 |
| 6,321,339 B1 * | 11/2001 | French et al. | | 713/201 |
| 6,334,121 B1 * | 12/2001 | Primeaux et al. | | 706/62 |
| 6,345,263 B1 * | 2/2002 | Matsumoto et al. | | 705/41 |
| 6,385,596 B1 * | 5/2002 | Wiser et al. | | 705/51 |
| 6,463,418 B1 * | 10/2002 | Todd | | 705/26 |
| 6,598,027 B1 * | 7/2003 | Breen et al. | | 705/26 |
| 6,785,661 B1 * | 8/2004 | Mandler et al. | | 705/39 |
| 7,051,000 B2 * | 5/2006 | Kodama et al. | | 705/37 |
| 7,103,568 B1 * | 9/2006 | Fusz et al. | | 705/26 |
| 7,231,380 B1 * | 6/2007 | Pienkos | | 1/1 |
| 7,249,097 B2 * | 7/2007 | Hutchison et al. | | 705/39 |

* cited by examiner

METHOD AND APPARATUS FOR SCREENING TRANSACTIONS ACROSS A GLOBAL COMPUTER NETWORK

CROSS-REFERENCE TO RELATED APPLICATION

The present invention claims the benefit of U.S. Ser. No. 60/169,249 filed Dec. 6, 1999.

BACKGROUND OF THE INVENTION

The present invention relates generally to electronic commerce that takes place across a global computer network and more particularly to screening transactions across the Internet.

Electronic commerce offers many opportunities to market and sell products on a worldwide basis at a fraction of the cost associated with traditional sales methods. However, electronic transactions create potential problems and risks as well. As business moves swiftly to provide products and services over the Internet, there are a variety of issues that must be considered and safeguarded against.

Frequently little, if anything, is known about a customer who wishes to buy a product or service over the Internet. Still a customer must often be qualified in some way to purchase certain items. For instance, the purchase of certain types of weapons such as handguns, may require a potential customer to be screened by submitting to a background check. Implementing a transaction screening method becomes more difficult when the transaction takes place electronically.

Under Food and Drug Administration (FDA) regulations and equivalent non-U.S. regulations, medical devices may only be sold for use by licensed medical practitioners, or in the alternative, to authorized distributors of medical equipment. Additionally, a distribution contract may need to be in place before completing a sale. Finally, in order to sell a medical device, the device itself may have to be registered, or otherwise approved, in the country of sale. Therefore, when a sales transaction involving medical products takes place electronically, there must exist a mechanism to ensure that such equipment is not improperly sold, either to an unauthorized purchaser, or to a purchaser located in an unauthorized locale.

It would therefore be desirable to have a clearly defined and appropriately-scoped review process that is designed to acquire the information about the potential customer necessary to ensure a proper sale of such restricted products. Further, it would be desirable for the review process to be applicable for consistent use by all components of a business, thus reducing the amount of variation associated with the electronic sales transactions. Therefore, it would be desirable to have an efficient method and system for screening transactions across a global computer network.

SUMMARY OF THE INVENTION

The present invention is a method and system for screening potential customers for transactions that take place over a global computer network that overcomes the aforementioned problems and meets the aforementioned requirements.

The present invention describes a technique by which a customer may purchase desired products, with such products selected from unrestricted and restricted product categories. The transaction takes place electronically, thus avoiding the necessity for the seller and/or buyer to travel to meet one another. The invention involves screening the customer and the selected product using customer information and product data as requested by the seller and entered by the customer at a user interface in order to ensure that the customer is authorized to purchase the desired product.

In accordance with one aspect of the invention, a method for screening transactions using a computer network includes providing a user interface for a customer to access an automated seller facility, the facility having unrestricted and restricted product categories. Access to the facility is provided electronically and takes place over a computer network. The purchaser accesses a user interface configured to permit the customer to enter customer data for the purpose of purchasing products. The method includes receiving the customer data, which may comprise an account number and a product order wherein the customer specifies a desired product to be purchased over the computer network. The method also includes determining whether the product desired by the customer falls within a restricted product category, and if so, checking whether the customer is an authorized buyer of such restricted product. The method also provides for issuing a customer authorization code if the customer is an authorized buyer or if the desired product falls within the unrestricted product category and accepting the product order only if at least one of at least two conditions are satisfied. The at least two conditions include whether the customer is an authorized buyer of restricted products and if the desired product is in the unrestricted product category, thereby indicating the customer and the product order have been accepted for purchasing the desired product, and if not, rejecting the product order.

In accordance with another aspect of the invention, the above-described steps are accomplished by a network-based system for screening transactions. The system includes a customer accessible computer from which a user may order a desired product selected from unrestricted and restricted product categories. The system also includes a supplier network of computers that comprise a two-tier computer system. A first tier computer system is programmed to receive customer data of the kind described above, which is transmitted from the customer accessible computer. The first tier system is further programmed to confirm that the customer data and order are complete. The network-based system's supplier network also includes a second tier computer system which is programmed to receive the customer order and data from the first tier system. The second tier system determines whether the desired product, which has been selected for purchase by the customer, is from the restricted product category or to a restricted location. If it is, the second tier system checks to ensure that the customer is an authorized purchaser of the restricted product.

In accordance with another aspect of the invention, a computer memory medium is disclosed having thereon a computer program for use with one or more computers. The programs, when executed, cause the one or more computers to acquire customer information such as customer date described above. Thus, the customer is able to access by way of a user interface an automated seller facility having unrestricted and restricted product categories. The computer program determines whether the product selected by the customer is a restricted product, and if it is, the computer program checks whether the user is an authorized buyer of such restricted product. The computer program then creates a customer authorization code to indicate that the customer has been approved. After further processing, if the order is approved, the computer system so notifies the customer.

In accordance with yet another aspect of the invention, a computer data signal is embodied in a carrier wave and represents a sequence of instructions. When executed by one or more processors, the wave causes the processors to screen the transactions over a computer network. A customer accessible computer is connected to one or more seller computers by way of a network. The processors further transmit the customer information over the computer network to the seller's computer. The processors are programmed to screen the transactions by delineating between non-restricted products, which can be purchased by a general group of purchasers, and restricted products, which may only be purchased by pre-approved purchasers.

The present invention is particularly useful for screening the potential customer and desired product in electronic direct-sale transactions taking place over the Internet. Using the invention provides a fast, secure, and automated way of ensuring that a variety of goods, some restricted and some not, are able to be purchased by appropriately authorized customers only or shipped to non-restricted locations.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
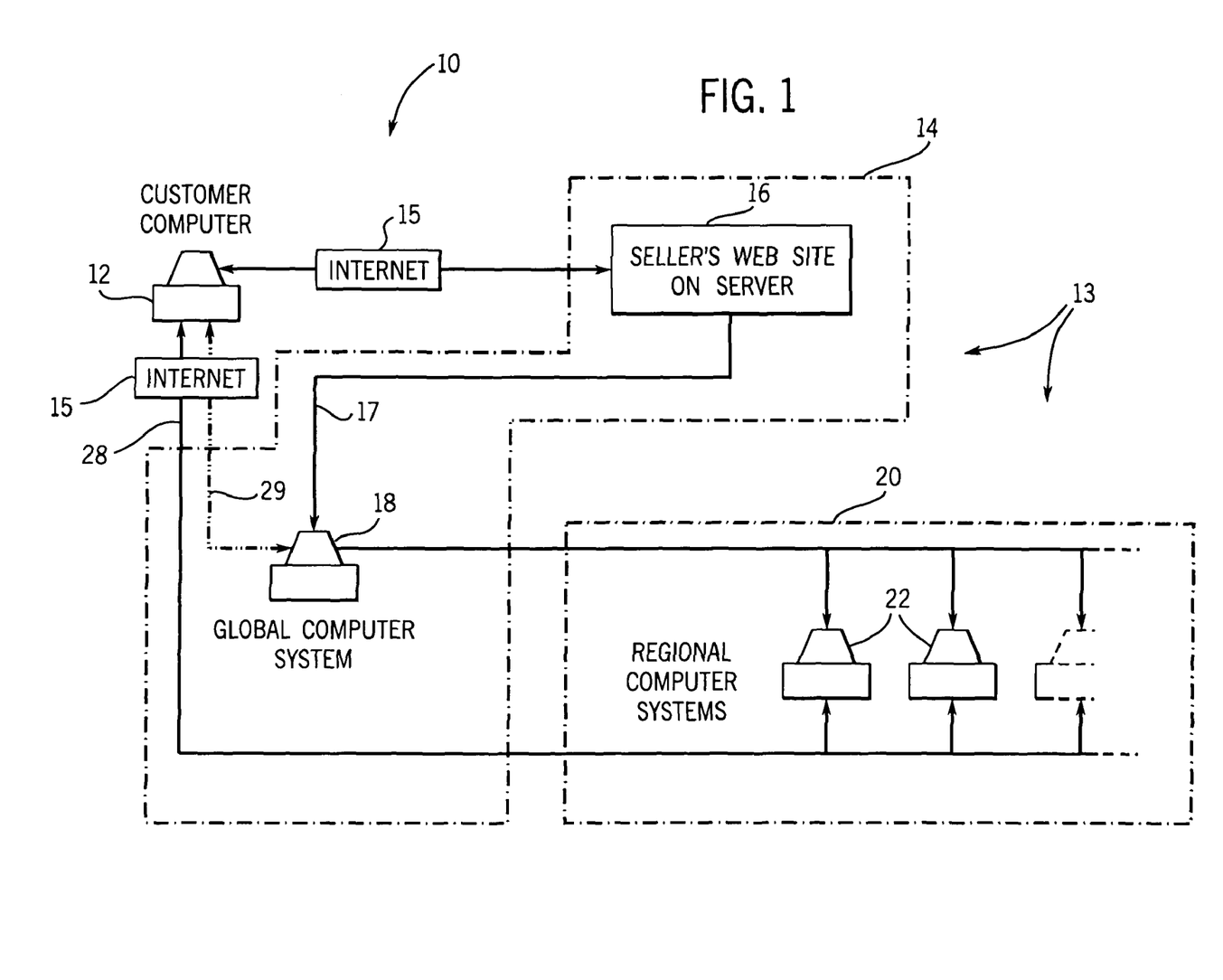
FIG. 1 is a schematic block diagram of a network system for use with the present invention.

FIG. 1 shows the major components of a preferred computer network system 10 for screening transactions in accordance with the present invention. More specifically, the system 10 operates to screen transactions involving a customer transacting for products over a globally accessible computer network such as the Internet. The system sorts the products sought into two general categories: restricted products and non-restricted products. The restricted products are restricted for purchase either by qualified users of the product or authorized distributors of those products. Unrestricted products may be purchased by a more general group of buyers who may be authorized to purchase based on less stringent qualifications, for instance creditworthiness. The term "customer" hereby refers to an individual or entity who proposes to purchase goods or services, and more generally, and with regard to the preferred embodiment, a "customer" is one the system and method must deal with one way or another. In the present invention, a "customer" must be dealt with regardless of whether or not a purchase for goods or services ultimately takes place. In other words, a "customer" need not necessarily be one who actually buys a product, but includes those who are refused such a transaction.

The invention is described in terms of the preferred embodiment wherein the product desired For purchase by the customer falls within a restricted product category if it includes such items as medical equipment, such as computed axial tomography (CAT/CT) scanners, magnetic resonance (MR) imagers, ultrasounds and the like, or product information relating to medical equipment, or service information pertaining to medical equipment and/or services. Such restrictions are typically required by a governmental agency, such as the Food and Drug Administration of the United States. A non-restricted or unrestricted product category includes those products that can be purchased by a general group of purchasers. The system 10 therefore delineates between restricted and non-restricted products. To purchase a restricted product, the customer must be authorized, or otherwise pre-approved for such purchases. It should be apparent then that this system can be applicable to screening other types of restricted products or sales/delivery to restricted locations, and that the restricted products described therein are exemplary only. Therefore, this system would be useful For selling practically any products requiring buyer identification, other than for simple credit approval, prior to approving the sale. The restricted locations are restricted based on such factors as trade regulations as specified by various government entities.

The network includes a customer accessible computer 12 which provides a user interface to allow a customer to access an automated seller facility 13, having a first tier system 14, and a second tier system 20. Access is provided by way of a globally accessible computer network 15, such as the Internet. The automated seller facility 13 includes server 16 having a seller's web site thereon which is accessible to the buyer via the network 15.

Once having accessed the seller's web site, which is connected to a supplier network by a communication line 17, the customer provides specific customer identification information. An initial first tier screening is performed by a processor at server 16 or at a processor within a global computer processing system 18 to reject any order that is incomplete. The global processing center 18 is preferably situated in the seller's country of business. The automated seller facility 13 receives the customer information from the customer accessible computer 12, including a product order specifying the desired product and/or services. A product order, as used herein, preferably refers to an offer to purchase by the customer, but it should also be understood to include a purchase acceptance by the customer.

After the initial screening in the first tier system 14, an approved prospective purchase offer proceeds to a second tier system 20 having regional computer systems 22 connected with the global processing center 18. The regional systems 22 are preferably situated in the buyer's country of business or in a country having a processing center responsible for a number of countries, one of which is the customer's designated country. The regional systems 22 are considered to be part of the second tier screening system 20 because of the level of processing required and the databases needed. If the buyer and seller are located in the same country, the regional computer systems 22 may be located in the same country as the global computer systems 18, and thus could be incorporated into the first tier system 14.

The regional processing centers 22 constitute the second level or tier system 20 for screening the transaction between the seller and the customer. The specific methods for screening will be discussed below with reference to FIGS. 2-4. Generally, the second tier computer system 20 receives the customer information, determines whether or not the desired product is within the restricted product category, and further checks to ensure that the customer is an authorized purchaser of the product selected for purchase or to an un-restricted location, as well as performing a credit worthiness function. The overall system 10 permits direct correspondence, such as by email, via communication lines 28 and 29 between the customer accessible computer 12 and the global and regional processing centers 18, 22. Communication line 29 is dashed to indicate that direct correspondence between the customer accessible computer 12 and the global processing center 18 can take place when the global processing center conducts second tier screening of the customer. Direct communication is possible throughout the processing of the transaction as will be further described hereinafter.

Figure 2:
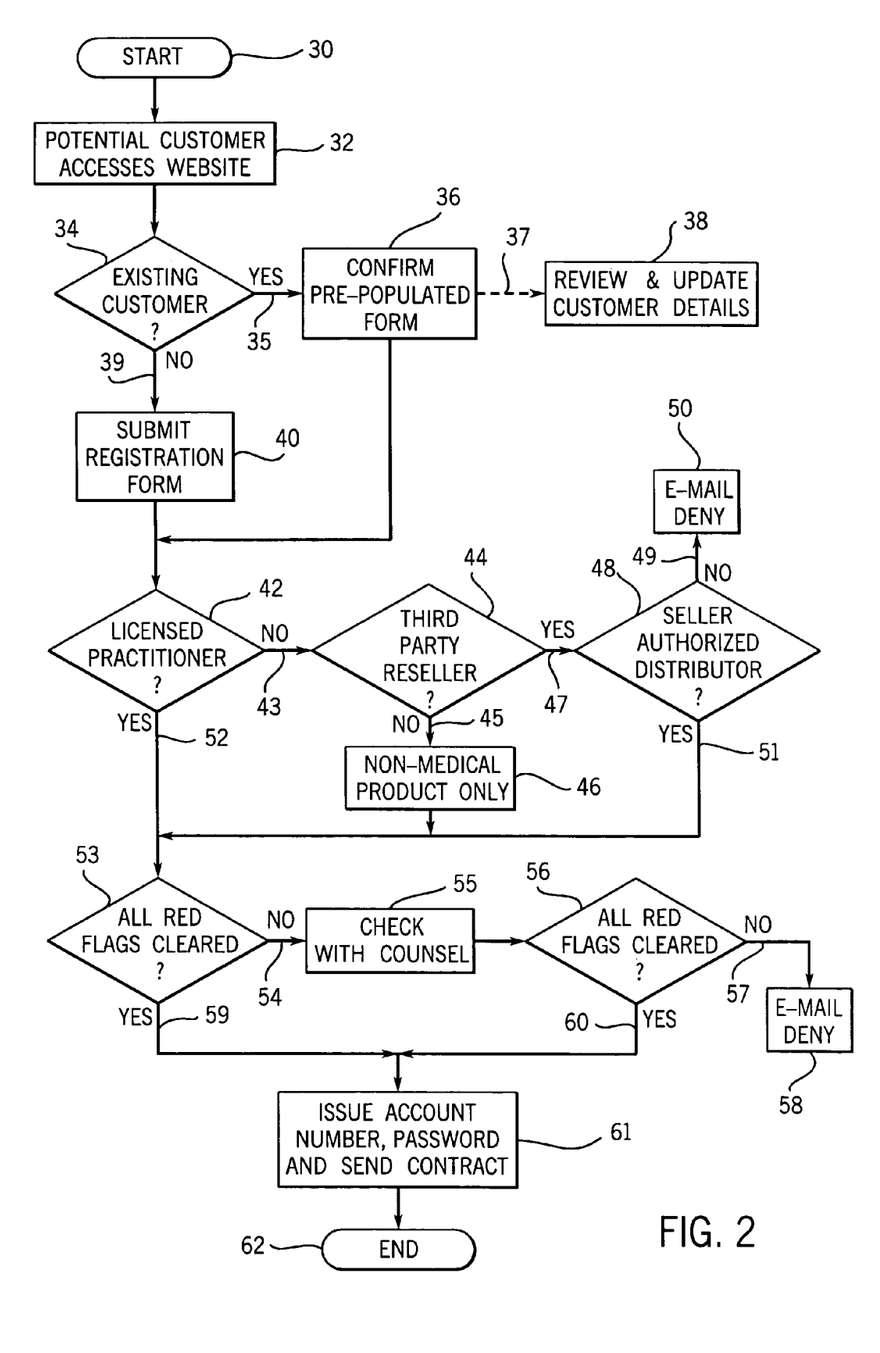
FIG. 2 is a flowchart representing one embodiment of the present invention for use with the system of FIG. 1 for use by a potential customer without an account number.

In FIG. 2, a potential customer initiates a transaction 30 to purchase products, which have been sorted into unrestricted and restricted product categories, by using a computer to connect to the Internet, and subsequently, to gain access to the seller's web site 32. After accessing the web site 32, the system checks to determine whether the customer is an existing customer 34 with an account number. If so 35, an online registration form is provided having fields for customer data that are already entered using information stored in a seller-accessible database. It is then the customer's responsibility to confirm the pre-populated customer details 36 for correctness. Customer data might include: customer name, billing and shipping addresses, country of residence, entity type (i.e., corporation, partnership, individual) as well as other required pertinent information. Preferably, such customer details will be updated 38 in a database and the information will be screened and reviewed. The periodic nature of such updates is represented by a dashed line 37. If the customer is not an existing customer 34, 39, the customer submits an online registration form 40 to provide the seller with the requisite customer identifying information.

The registration form itself includes a number of fields to be completed by the buyer in a user interface, preferably a graphical user interface, which is provided by the seller's web site. The submitted registration form 40 must have every required field in the user interface properly completed. Where required data is missing or immediately determined to be invalid, such as an improper zip code, the system will restrict the customer from transacting until the required fields are completed. A country designated by a customer must be a country in which the seller is authorized to do business. All such permitted countries may be provided by the seller, for example in a drop-down menu within the graphical user interface.

Once a valid customer registration form has been submitted 40, the system then proceeds with determining whether the customer is authorized to purchase the desired product over the network. This is accomplished by checking whether the customer is a licensed health care provider 42, as such providers are authorized to purchase restricted medical products. If the customer does not fall within the licensed health care provider group 43, the system automatically checks to determine whether the customer is a third party reseller or distributor 44 of medical products. If not 45, the customer will only be permitted to purchase non-medical products 46 in the transaction, or, more generally, products from the unrestricted product category. If the customer does qualify as a third party reseller 44, 47, the system checks to determine whether the customer is a distributor who has been specifically authorized by the seller 48 to purchase medical products. If not 49, the system will deny any sale to the potential customer and an email indicating the denial will be sent to the customer 50, alternatively, a direct customer contract or interaction may be made. These checks ensure that medical products are purchased for use by only those who are authorized. Further, they function to ensure that sensitive pricing and/or product information may only be accessed by such authorized customers.

If however, the customer is a seller-authorized distributor 48, 51, and similarly if the customer is a licensed practitioner 42, 52 or is buying for use by such a licensed practitioner, the system checks to determine whether all "red flags" have been cleared 53. Red flags are inconsistencies in the customer-provided data such as: customer identification details that do not appear to match those of a medical practitioner, clinic, or hospital; a customer who appears to be an overseas purchasing agency, although based in the seller's country; and different billing and shipping addresses. If all red flags are not cleared 54, the system provides for contacting and checking with the appropriate counsel 55, such as legal counsel or contract manager, who then document and review the relevant issues. Once accomplished, the system revisits the question of whether all red flags have been cleared 56, and if not 57, the customer is prohibited from transacting further and is sent an email 58 indicating the same. If all red flags are cleared 53, 59 or 56, 60, the customer has been determined by the system to be an authorized buyer of restricted, and in this case medical, products or even unrestricted products but not to restricted locations. As such, the system then issues the customer an account number and password, and then proceeds to send the customer an electronic business contract, if not an existing customer 61. The contract can then be completed after the customer obtains the authorization code, which can include the account number and password or login ID so as to enable the customer to proceed while the contract is processed. The account number and password or login ID, which are unique to the particular customer, provide the customer with the appropriate security access to proceed with their intended purchase. This completes the flow chart process 62 of FIG. 2.

Figure 3:
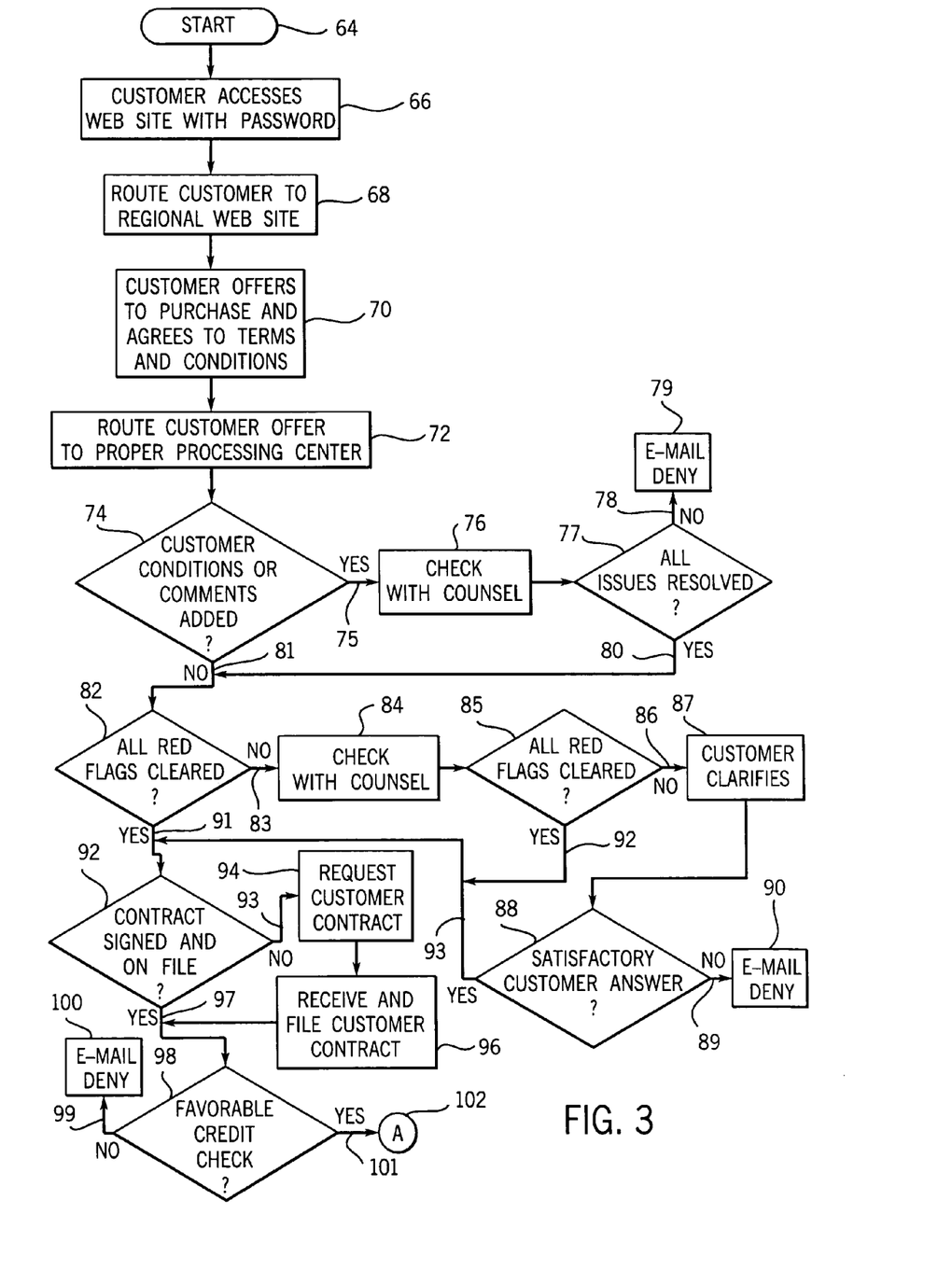
FIGS. 3 and 4 is a flowchart representing one embodiment of the present invention for use with the system of FIG. 1 and for use by a potential customer after an account number is assigned.

Referring to FIG. 3, the customer begins 64 the second tier of screening by accessing the seller web site 66 using the account number and password acquired at 61 of FIG. 2. The customer is then automatically routed by the system to a regional web site 68, FIG. 3, or in other words, a web site whose content specifically pertains to the destination country of the desired product, the buyer's country. This is done to ensure that sensitive pricing or pertinent terms and conditions of sale and/or information which the customer accesses is from the relevant country only, and further, to provide for efficient access to that information.

Next, the customer proceeds with making an offer 70 to purchase products, and in so doing, the customer agrees to the terms and conditions of sale which have been defined by the seller. The terms and conditions include such items as allowing the seller to run a credit check on the purchaser and stipulating specific financing terms to ensure that the purchaser is indeed authorized to purchase the products specified in the product order. In rare conditions, the customer may, if he chooses, ask if additional terms and conditions can be added or the existing terms and conditions be modified, or simply state additional comments, if desired. Once the offer is sent by the customer, it is routed to the proper regional processing center 72 where the information provided by the buyer may be further evaluated. The offer to purchase is then checked to determine if any terms and conditions modified or additional terms and conditions have been added 74 by such buyer. If so 75, the buyer-specified terms and conditions in the offer are checked by counsel 76 to resolve any potential issues and to ensure that such terms and conditions are satisfactory to the seller. If any issues are raised by the buyer in the form of additions or modifications to the offer are not resolved to the satisfaction of the seller 77, the customer is again sent an email declining the purchase offer or requesting additional clarification. If, however, all issues are adequately resolved 77, 80, the system will check—as it would if the customer had not added any language to the standard offer to purchase 74, 81—to ensure that no red flags exist 82 which could potentially prohibit a sale to the prospective buyer. The "red flags" checked may include, in addition to the items described above, abnormally large purchase orders or unusual payment terms. Also, a red flag may be triggered if the customer designates a proscribed country as a product destination in which such product is not allowed delivery into.

Still referencing FIG. 3, if red flags are raised 82, 83, the system again routes the purchase offer to be checked by the seller 84, preferably legal counsel or contract manager. Once checked by counsel 84, the system ensures that all red flags have now been cleared, and if they have not 86, the customer is given the opportunity to clarify the problem areas 88 by providing answers to questions related to the red flags. These answers are checked 88, but at this point if they are deemed unsatisfactory 89 by the seller (or seller's representative or counsel), the buyer is informed via email the purchase offer must be denied 90. On the other hand, if all red flags are cleared, either prior to checking with counsel 84 as in 82, 91, or after, as in 85, 92 or 88, 93, the offer to purchase is permitted to proceed.

Next, this system checks whether a signed contract has now been received and is on file 92 at the processing center. Preferably, a hand-written or "hard" signature will be on file and the signature will be a verified one. However, it is contemplated that the invention may also provide for electronic signature validation. The purchase offer may also need to come from the agreed source and/or electronic login. A customer contract with signature will be requested 94 if it is missing 93. Once the contract with appropriate signature is received for filing 96, the system is allowed to proceed with the transaction. Once the contract is signed and on file 97, the system determines whether the customer's credit is favorable 98. If not 99, the customer is denied and the customer is notified via email 100. If the customer meets the requisite credit qualifications 101, the customer may proceed with the purchase 102, FIG. 4.

Figure 4:
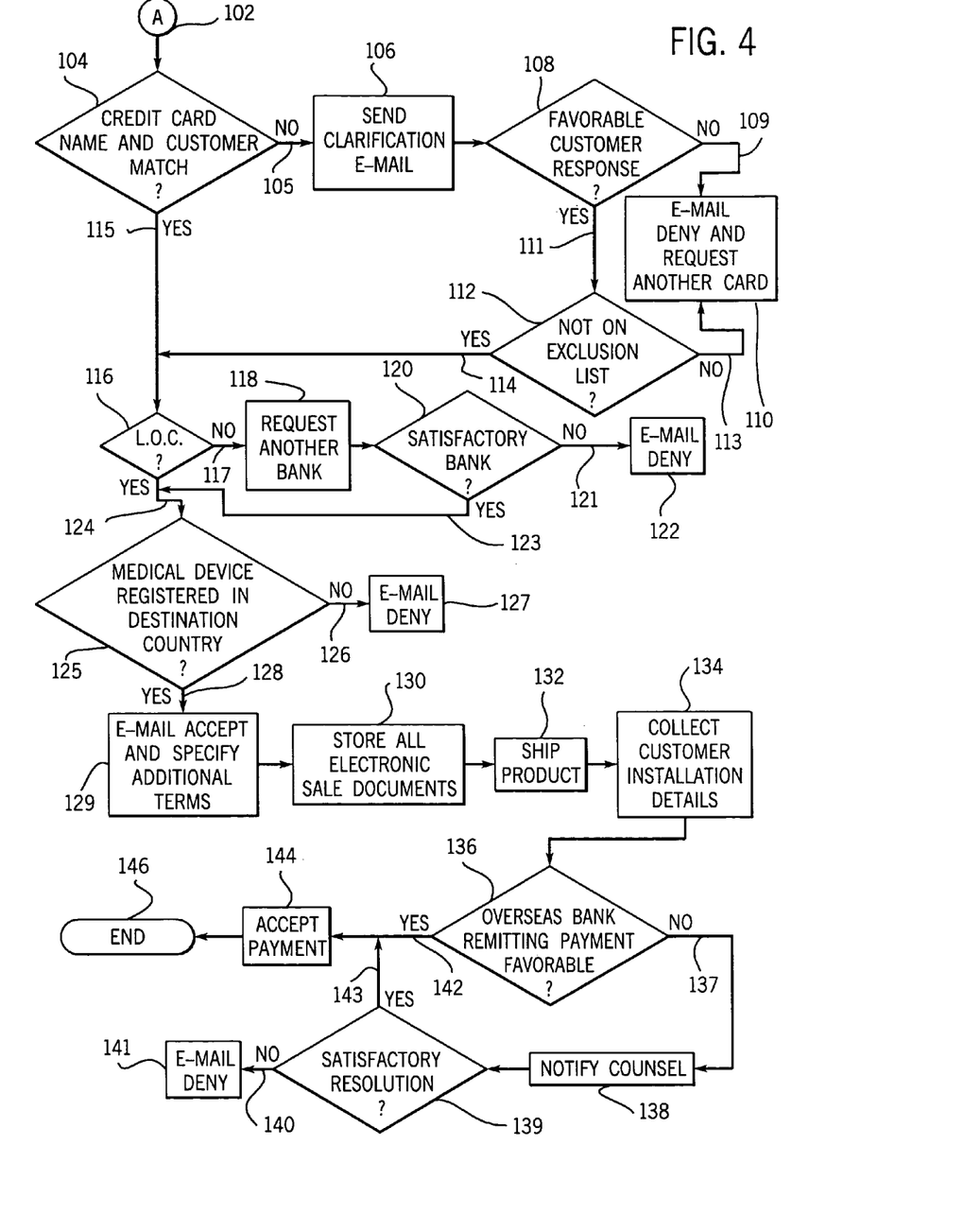

Referring now to FIG. 4, the system next determines whether the name associated with any credit card used for purchase matches the customer name 104, and if not 105, clarification email is sent 106. This step is significant in thwarting any money-laundering attempts by a potential customer, who is known to the seller only by the data entered. Without an acceptable customer response 108, 109, the system will deny any offer to buy and request by email 110 that a different credit card be used by the customer. Following a favorable customer response 108, 111, the system will check 112 whether the customer is on a seller-determined list of excluded customers, such as those identified by the relevant government authorities, and others with whom the seller has had an unsatisfactory transaction history. If the customer is found to be on any exclusionary list 113, the customer will be denied 110 as described above. Otherwise, at 112, 114, the system will permit the customer to proceed 115, as it did at 104, 115 wherein the credit card name and customer matched initially.

The system next checks the prospective approved purchaser to determine whether a letter of credit has been opened on their behalf 116 if the purchase is not by credit card or similar form of payment. If so, the system checks whether the designated overseas financial institution is not on an exclusionary list. The system is configured to check for whatever qualifications the seller may select. For example, the system may be configured to check for past transactions involving the particular lender to determine whether a letter of credit should be accepted. If the customer has indicated an unapproved lender 117, the system requests that the customer select another institution 118. Once another selection has been made, the system will again check to determine whether the designated lending institution is satisfactory 120, and if not 121, the system will notify the customer via email that the transaction will be prohibited 122. However, if satisfactory, 120, 123 or 116, 124, the customer is deemed to have a letter of credit that is sponsored by an approved lender.

At this point, the system determines whether the medical device selected for purchase is registered 125 so as to be in compliance with the requisite rules and regulations of the destination country, and if not 126, the customer is denied the purchase 127, again via email or the local country representative are informed via email to ensure steps are taken to register the product. If accepted, 125, 128, the customer is so notified 129. Further, at this point, all additional terms relating to the purchase are to be specified. For instance, the delivery terms such as date and time might be included. Additionally, all documents pertaining to the purchase are stored 130 according to the seller's retention policies and the product is shipped 132 to the purchaser. Customer installation site details are collected 134 to facilitate potential future interaction between the seller and customer, such as product servicing or compliance with appropriate regulations.

As a final check, the system determines whether the overseas bank remitting the payment for the desired products and/or services are on the exclusionary list. If not 137, the seller's counsel is notified 138 so as to determine whether a satisfactory resolution can be reached 139. If not, 140, the customer will receive email 141 requesting payment by another means. If the overseas bank is approved for payment 136, 142, or if a satisfactory resolution to the problem of having an unapproved overseas bank is reached, 139, 143 (for example, selecting another overseas financial institution) the payment for the product ordered is accepted 144 and the process is then complete 146.

Accordingly the invention includes a method for screening transactions using a computer network. The method comprises providing a user interface for a customer to access an automated seller facility, the facility having two types of product categories, unrestricted and restricted. Access to the facility occurs over a computer network. The user interface is configured to allow the customer to enter customer data for the purpose of purchasing products from the automated seller facility. The method includes receiving the customer data comprising an account number, if there is one, and a product order from the customer. The product order specifies a particular product which is desired to be purchased over the computer network. The method next includes determining whether the desired product falls within the restricted product category, and if it does, the method further provides for checking whether the customer is an authorized buyer of such a restricted product. The method also includes checking at different stages as to whether the delivery is to be made to a proscribed/restricted country.

The method allows for issuing a customer authorization code to authorized buyers or to buyers selecting products that fall within the unrestricted product category, with the authorization code therefore indicating that the customer has been approved for purchasing the desired product. If the customer is not approved, no product offer will be accepted. If an account number was previously issued, either manually or automatically, the system will provide a pre-populated registration form having all the customer data therein. The customer is then asked to review the data and confirm the accuracy thereof.

The method for screening provides that a product order may be a purchase offer in which the customer offers to purchase the desired products, and that if this is so, the method further comprises the step of creating a product offer acceptance confirmation of the purchase offer. The method comprises sending the offer acceptance confirmation to the customer. The method also comprises the steps of a seller defining a set of terms and conditions and checking whether the customer has changed the seller defined terms and conditions in the product purchase offer, and if this is the case, ensuring that such changes are satisfactory to the seller. The method includes confirming that each required field in the user interface has been completed, with the customer restricted from transacting should any of the required fields have been left incomplete. The method includes checking whether the customer's selected method of payment is an authorized method of payment for that specific customer.

The method further provides for requesting permission to check the customer's credit status. If permitted to do so, the credit status is checked, however if not permitted, the product order is rejected. Customer data includes the customer's billing and shipping addresses. The restricted product category includes at least one of the following: medical equipment, product information pertaining to medical equipment, and service information pertaining to medical services. Furthermore the method provides that to authorize a sale of restricted product, the purchase must be for use by a licensed purchaser of medical equipment or the buyer should be an authorized distributor of medical equipment.

The invention also includes a network-based system for screening transactions between a customer accessible computer from which a user may order a desired product which is selected from unrestricted and restricted product categories. The supplier network comprises a two-tier computer system. A first tier computer system is programmed to receive customer data which is transmitted from the customer's computer, the customer data including information as previously described. The first system is further programmed to confirm that the customer data and order are complete.

The network-based system's supplier network also includes a second tier computer system which is programmed to receive the customer order and data from the first tier system. The second tier system determines whether the desired product has been selected by the customer from the restricted product category, and if so, the second tier system checks to insure that the customer is an authorized purchaser of the restricted product. The second tier system also determines whether sale/delivery of any products are to proscribed/restricted countries.

The invention also includes a computer memory medium disclosed to have thereon a computer program for use with one or more computers which, when executed, causes the one or more computers to acquire customer information including a customer identification, an account number, if any, and a product order. The product order specifies a desired product selected by a potential customer at a user interface which allows the customer to access an automated seller facility having unrestricted and restricted product categories.

The computer is programmed to determine whether the desired product is in fact in the restricted product category. If it is, the computer checks whether the user is an authorized buyer of such restricted product. The computer is further programmed to create a customer authorization code so as to indicate that the customer has been approved, and to notify the customer of such approval. It should be further noted that the computers include bulk access memory which can accept the information transmitted from the customer or computer.

The invention further comprises a computer data signal, which is embodied in a carrier wave. The signal represents a sequence of instructions which, when executed by one or more processors, causes the processors to screen the transactions over a computer network between a connected customer and seller computers. The processors further transmit the customer information, which may include customer identification, an account number, and a product order over the computer network to the seller's computer. The processors delineate between non-restricted products, which can be purchased by a general group of purchasers, and restricted products, which may only be purchased by pre-approved purchasers. The computer signal and program include acts to coincide with the steps of the aforementioned method and to implement the aforementioned system.

Although the present invention is readily applicable to screening product orders between a customer and seller for medical devices, it is readily apparent to those skilled in the art that the present invention is applicable to any transaction wherein the product, customer, or country of residence of customer or destination for shipment of product must be screened before the requisite authorization to complete the transaction may take place.

The present invention has been described in terms of the preferred embodiment, and it is recognized that equivalents, alternatives, and modifications, aside from those expressly stated, are possible and within the scope of the appending claims.

The invention claimed is:

1. A method for screening transactions using a computer network, the method comprising the steps of:
   providing a user interface for customer access to an automated seller facility having unrestricted and restricted product categories, the access taking place over a computer network, the user interface allowing a customer to enter customer data to purchase products from the automated seller facility;
   receiving the customer data comprising an account number, if any, and a product order, specifying a desired product from the customer over the computer network;
   determining whether the desired product is in the restricted product category, and if so, then checking whether the customer is an authorized buyer of such restricted product; and
   accepting the product order only if at least one of at least two conditions are satisfied, the at least two conditions comprising: if the customer is an authorized buyer of restricted products and if the desired product is in the unrestricted product category, thereby indicating the customer and the product order have been accepted for purchasing the desired product, and if not, rejecting the product order.

2. The method of claim 1 wherein the product order is a purchase offer in which the customer offers to purchase the desired products.

3. The method of claim 2 wherein the step of accepting the product order is further defined as having additional conditions, the additional conditions including ensuring that the customer is not in a restricted location, and ensuring that the desired product is not being shipped to a restricted location.

4. The method of claim 1 further comprising the steps of a seller defining a set of terms and conditions and checking whether the customer has changed the seller defined terms and conditions in the product purchase offer, and if so, ensuring that such changes are satisfactory to the seller.

5. The method of claim 1 wherein the user interface includes a plurality of required fields and wherein the method further includes the step of confirming that each required field in the user interface has been completed, and if not, then restricting the customer from transacting until all required fields are complete.

6. The method of claim 5 wherein the customer data further includes a method of payment, and includes the step of checking whether the method of payment is an authorized method of payment for the customer.

7. The method of claim 5 further including the step of transmitting the customer data and product order to a processing center after receiving the customer data and product order with all required fields in the user interface having been completed.

8. The method of claim 7 wherein the step of transmitting customer data and product order information to a processing center includes transmitting the customer data from a global processing center to a regional processing center.

9. The method of claim 2 wherein the step of determining whether the desired product is in the restricted product category, and if so, then checking whether the customer is an authorized buyer of such restricted product further includes requesting permission to check the customer's credit status, and if permitted, checking the credit status, and if not, rejecting the purchase offer.

10. The method of claim 1 wherein the step of checking whether the customer is an authorized buyer occurs at the processing center.

11. The method of claim 1 wherein the customer data is defined further to comprise customer billing and shipping addresses.

12. The method of claim 1 wherein the restricted product category can include at least one of: medical equipment and product/service information pertaining to medical equipment and services.

13. The method of claim 12 wherein customer designates a destination country for receiving the desired product and wherein the medical equipment is properly registered in the destination country.

14. The method of claim 1 wherein the buyer is one of a licensed purchaser of medical equipment and an authorized distributor of medical equipment to authorize a sale.

15. The method of claim 1 wherein the automated seller facility comprises a supplier network of computers having a first tier computer system programmed to receive and ensure the completeness of the customer data, as well as a second tier computer system programmed to receive the customer data from the first system and ensure that the customer is an authorized purchaser of the desired product.

16. The method of claim 2 further comprises the step of sending an electronic contract to purchase the desired product to the customer after the seller accepts the purchase offer from the customer.

17. The method of claim 1 wherein the computer network is a globally accessible computer network having global and regional processing centers.

18. The method of claim 1 further including the step of clearing any red flags, prior to shipping the desired product.

19. A computer readable medium having stored thereon a computer program which, when executed by one or more computers, causes the one or more computers to:
acquire customer information comprising an account number, if any, and a product order specifying a desired product from a customer at a user interface, so that the customer may access an automated seller facility having unrestricted and restricted product categories;
determine whether the desired product is in the restricted product category, and if so, then checking whether the user is an authorized buyer of such restricted product;
accept the product order if either the customer in an authorized buyer of products in the restricted products category or if the desired product is in the unrestricted product category, thereby indicating the customer and the product order have been accepted for purchasing the desired product, and if not, reject the product order.

20. The computer readable medium of claim 19 wherein the restricted product category can include at least one of: medical equipment and product/service information related to medical services and equipment.

21. The computer readable medium of claim 19 wherein the product order is a purchase offer in which the customer offers to purchase the desired products, and wherein a contract is not formed until the offer to purchase is accepted by the automated seller facility after pre-specified conditions are satisfied.

22. The computer readable medium of claim 19 wherein the acquisition of customer information further includes a confirmation that each required field in the user interface has been completed, and if it has not, then customer access is restricted until all required fields are complete.

23. The computer readable medium of claim 19 wherein the customer information further includes a method of payment, and if the customer and order have been authorized, then checking whether the method of payment is an authorized method of payment for that customer.

24. The computer readable medium of claim 21 wherein the computer program stored thereon further causes the one or more computers to check whether the customer has changed a set of terms and conditions defined in the user interface of the product purchase offer, and if so, ensuring that such changes are satisfactory to the automated seller facility.

25. The computer readable medium of claim 19 wherein the computer program stored thereon further causes the one or more computers to create and send an offer declination if pre-specified conditions are not satisfied.

26. The computer readable medium of claim 25 wherein the computer program stored thereon further causes the one or more computers to provide a pre-populated form in response to an account number entry by an existing customer requiring customer confirmation of data therein.

27. The computer readable medium of claim 19 wherein the act of acceptance of the product order is further defined as requiring an assurance that the customer is not in a restricted location and that the desired product is not being shipped to a restricted location.

28. The computer readable medium of claim 19 wherein the computer program stored thereon causes the one or more computers to further check whether the customer is one of a licensed purchaser of medical equipment and an authorized distributor of medical equipment, when checking whether the customer is an authorized buyer, and the restricted products are further defined to include medical equipment.

29. The computer readable medium of claim 19 wherein checking whether the customer is an authorized buyer further includes checking the customer's credit status and authorizing the customer's designated lending institution, if any.

30. A computer data signal embodied in a carrier wave, the signal representing a sequence of instructions which, when executed by one or more processors, cause the one or more processors to screen transactions received over a computer network by:
connecting a customer accessible computer to at least one seller computer via a network;
transmitting customer information comprising an account number, if any, and a product order over the network to the at least one seller computer; and delineating between non-restricted products that can be purchased by a general group of purchasers and restricted products that can be purchased only by pre-approved purchasers.

31. The computer data signal of claim 30 wherein the one or more processors are further caused to screen transactions by automatically determining, using the customer information, whether the customer is one of the pre-approved purchasers.

32. The computer data signal of claim 30 wherein the one or more processors are further caused to screen transactions by determining whether the desired product is a restricted product.

33. The computer data signal of claim 30 wherein the restricted product can include at least one of: medical equipment and product/service information related to medical equipment and services.

34. The computer data signal of claim 30 wherein the one or more processors are further caused to screen transactions by providing an authorization code indicating that the customer is approved for further processing to determine if the desired product is a restricted product.

35. The computer data signal of claim 30 wherein the one or more processors are further caused to screen transactions by confirming that the customer information is entered such that each required field in a user interface has been completed, and if not, returning the information to the customer for completion.

36. The computer data signal of claim 30 wherein the pre-approved purchasers are further defined to include licensed health care professionals and authorized health care distributors.

37. The computer data signal of claim 30 wherein the one or more processors are further caused to accept the product order only if the customer is not in a restricted location and the desired product is not being shipped to a restricted location.

38. The computer data signal of claim 30 wherein the product order is a purchase offer in which the customer offers to purchase the desired products.

39. The computer data signal of claim 38 wherein the one or more processors are further caused to screen transactions by checking whether a set of terms and conditions defined by the seller in the product purchase offer have been changed by the customer, and if so, ensuring that such changes are satisfactory to the seller.

40. A network-based system for screening transactions comprising:

a customer accessible computer from which a user may order a desired product from a seller facility having unrestricted and restricted product categories;
a supplier network of computers including:
a first tier computer system programmed to receive customer data transmitted from the customer accessible computer including a product order specifying the desired product and an account number, if any, the first system programmed to confirm that the customer data and order are complete; and
a second tier computer system programmed to receive the customer order and data transmitted from the first system, determine whether the desired product is from the restricted product category, and if so, check to ensure that the customer is an authorized purchaser of such restricted product.

41. The network-based system of claim 38 wherein the product order is a purchase offer in which the customer offers to purchase the desired products.

42. The network-based system of claim 41 wherein the second tier computer system is further programmed to issue a customer authorization code if the customer is an authorized buyer or if the desired product is in the unrestricted product category, thereby indicating that the customer and product purchase offer have been approved for purchasing the desired product, and if not, then rejecting the purchase offer.

43. The network-based system of claim 41 wherein a set of terms and conditions are provided by the second tier system based on a country of origin of the user and checks whether the user has changed any of the terms and conditions in the purchase offer, and if so, ensures that such changes are satisfactory to the seller.

44. The network-based system of claim 40 wherein the restricted product category can include at least one of: medical equipment and product/service information pertaining to medical equipment and services.

45. The network-based system of claim 40 wherein the second tier system programmed to receive the customer data comprises global and regional processing centers.

46. The network-based system of claim 40 wherein an authorized purchaser is further defined as having indicated a method of payment for the desired product, and, if purchasing the product from the restricted product category, ensuring the user is authorized to purchase the desired product.

47. The network-based system of claim 40 wherein the supplier network is a globally accessible network having global and regional processing centers.

* * * * *